(12) United States Patent
Piemonte

(10) Patent No.: US 8,705,708 B2
(45) Date of Patent: Apr. 22, 2014

(54) INDICATORS FOR VOICEMAILS

(75) Inventor: Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1070 days.

(21) Appl. No.: 12/723,585

(22) Filed: Mar. 12, 2010

(65) Prior Publication Data

US 2011/0222673 A1    Sep. 15, 2011

(51) Int. Cl.
*H04M 1/64* (2006.01)
(52) U.S. Cl.
USPC ............... 379/88.12; 379/88.13; 455/412.2; 455/413
(58) Field of Classification Search
USPC ............... 379/88.12, 88.13; 455/412.2, 413
See application file for complete search history.

(56) References Cited

U.S. PATENT DOCUMENTS

| 5,519,766 A | 5/1996 | Jones | |
| 6,542,603 B1* | 4/2003 | Yamagata et al. | 379/373.01 |
| 6,895,257 B2 | 5/2005 | Boman et al. | |
| 8,401,163 B1* | 3/2013 | Kirchhoff et al. | 379/201.01 |
| 2004/0023643 A1 | 2/2004 | Vander Veen et al. | |
| 2006/0246877 A1* | 11/2006 | Kashanian et al. | 455/412.2 |
| 2008/0207176 A1* | 8/2008 | Brackbill et al. | 455/413 |

FOREIGN PATENT DOCUMENTS

WO    WO 2007/002753 A2    1/2007

* cited by examiner

*Primary Examiner* — Simon Sing
*Assistant Examiner* — Simon King
(74) *Attorney, Agent, or Firm* — Morgan, Lewis & Bockius LLP

(57) ABSTRACT

Methods and systems to examine, in one embodiment, content of a voicemail to determine whether the voicemail is message-less. An indicator that indicates the voicemail is message-less can be presented in response to determining that the voicemail is message-less. A method in an embodiment can be performed on either a client system or on a voicemail server. In another embodiment, a method can determine whether a length of the content of a voicemail is less than a period of time and can display an indicator that the voicemail has either no content or is very short.

19 Claims, 12 Drawing Sheets

INDICATORS FOR VOICEMAILS

BACKGROUND OF THE INVENTION

Modern telephone systems, such as a landline telephone or a wireless cellular telephone, include the ability to leave a voicemail message for the owner or user of the telephone. Typically, a caller to the phone number of that phone will hear a voicemail greeting telling the caller to leave a message. After the greeting, the caller has the opportunity to leave a message which is recorded on a voicemail system. In certain embodiments, the voicemail is recorded locally on a storage device which is part of a telephone or the voicemail may be recorded on a voicemail server or system maintained in the infrastructure, such as a voicemail server maintained in the infrastructure of a public telephone carrier, such as AT&T or Verizon or Verizon Wireless. These voicemails are recorded and maintained for later use by the owner or operator of the telephone device for which the voicemail account was established. For example, the user of the telephone device may connect to the voicemail system through a telephone call to the voicemail system to listen to one or more voicemails stored at the voicemail system.

Certain current systems employ a visual voicemail user interface to provide information about voicemails without requiring a user to listen to each of the voicemails. FIG. 1 shows an example of a user interface for visual voicemail on an iPhone from Apple Inc. of Cupertino, Calif. This visual voicemail system includes a voicemail user interface display region 10 which displays one or more voicemails such as voicemails 11, 12, and 13. Information for each of these voicemails can include a user name, such as Jenny, or a telephone number and other designations. In addition, the date the voicemail was received is also included. For example, it can be seen that the voicemail 11 was received on Dec. 28, 2009; further information about this voicemail, if available, can be obtained by selecting the information button 9 which is one of the user interface elements in voicemail user interface display region 10. Each voicemail can include information button 9, which when selected will display further information about the voicemail. Each voicemail includes control element 8 which may be used by a user to select the voicemail to cause it to playback or to pause its playback. As shown in FIG. 1, no voicemail has been selected; it can also be seen that there is no information about the duration of each voicemail. In this particular implementation, information about the duration of a voicemail does not appear until the voicemail is selected.

A user can select the voicemail by touching or otherwise selecting the voicemail to cause the playback of the voicemail and also to display two indicators which together show the duration or length of a voicemail. As shown in FIG. 2, voicemail 11 has been selected which causes control element 8 to change into control element 8A which is now a pause button, which if selected will stop the playback of the voicemail now being played. The playback of voicemail 11 is also shown by timeline 14 which includes a current time indicator 15 which can be manipulated by the user. Played time indicator 7A and remaining time indicator 7B together show the total duration of the voicemail, which in this embodiment appears only after a particular voicemail is selected for playback. Played time indicator 7A shows how much of the voicemail has already been played and remaining time indicator 7B shows how much of the voicemail remains to be played. A user can, by selecting the current time indicator 15, move to a different position in the voicemail by moving current time indicator 15 along the timeline 14. In the case of the example shown in FIG. 2, voicemail 11 has a total duration of 15 seconds. Once a voicemail has been selected, the user can select either the call back button 16 or the delete button 17 in order to either call back the caller who left the voicemail or to delete the voicemail, respectively.

While the user interface shown in FIGS. 1 and 2 provides many of the advantages of a visual voicemail system, it does not provide information about the duration of a voicemail until after it has been selected.

SUMMARY OF THE DESCRIPTION

Voicemail systems, methods, and computer readable non-transitory storage media are described herein. In one embodiment, a voicemail system can perform a method which includes receiving data representing content of a voicemail, and examining the content to determine whether the voicemail is message-less, and presenting an indicator that the voicemail is message-less in response to determining that the voicemail is, in fact, message-less. A message-less voicemail can be a voicemail that contains no discernible voice (or other sounds such as music). The presenting can include at least one of displaying an indicator on a display device or generating an audible message. The examination of the content can include determining whether the content includes a non-periodic variation of at least one of pitch and amplitude of the content of the voicemail. In one embodiment, the examination of the content can include determining a zero-crossing count and determining a rate of zero-crossings over a period of time. The system can further include the ability to learn characteristics associated with a content of one or more voicemails from a particular phone number, and these characteristics can be stored for later use when examining the content of a new voicemail from the same particular phone number. In one embodiment, the method can further include presenting a list of voicemails without showing, in the list, a length of each of the voicemails in the list but also presenting an indicator that a voicemail is message-less in the list. In this case, the lengths of each of the voicemails are not presented until selected unless the voicemail is message-less.

A method according to another embodiment of the present invention can use a voicemail server or other system to process the content of a voicemail to determine whether the voicemail is message-less and then transmit data to a client device to enable an indicator to be presented on the client device, wherein the indicator indicates that the voicemail is message-less if the voicemail server, after examining the content of the voicemail, determines that the voicemail is message-less. In this embodiment, the processing of the content is performed on a system remote from the client device but coupled to the client device through a network.

In another embodiment, a method of the present invention can include receiving data representing content of a voicemail and determining whether a length of the content is less than a period of time, and displaying an indicator that the voicemail has either no content or is very short if, in response to the determining of the length, the content is less than the period of time. In this method, a device can indicate that a voicemail is less than, for example, one second, etc. A method according to this embodiment may further include displaying an indicator that a voicemail has been determined to be a junk voicemail based upon an analysis of information about the voicemail. This analysis may include comparing a phone number or a prefix of the number or an area code of the number to a list or other data structure which represents sources of junk voicemails.

Other methods are described herein and systems for performing these methods are described herein, and computer readable non-transitory storage medium for causing the performance of these methods are also described herein.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
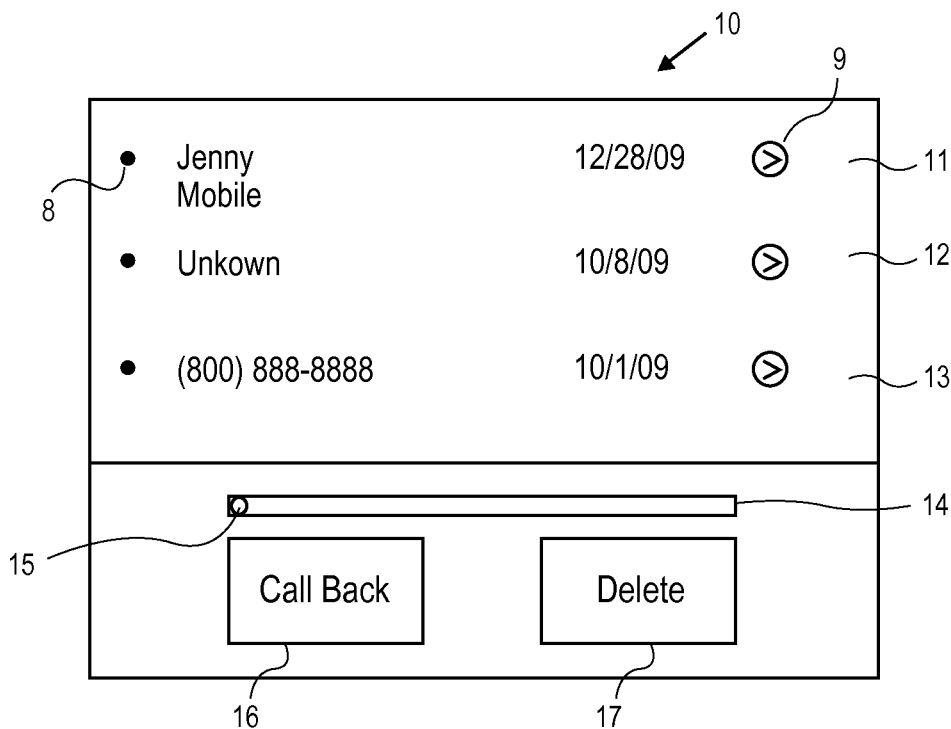
FIG. 1 shows an example in the prior art of a voicemail user interface.
Figure 2:
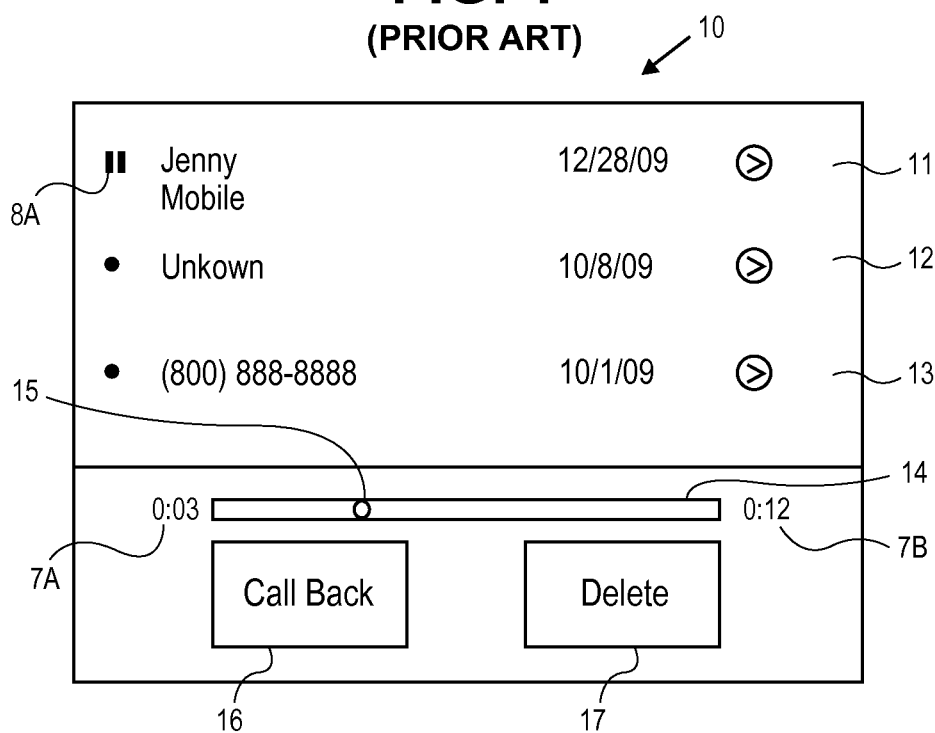
FIG. 2 shows another example in the prior art of a voicemail user interface after a voicemail has been selected.
Figure 3:
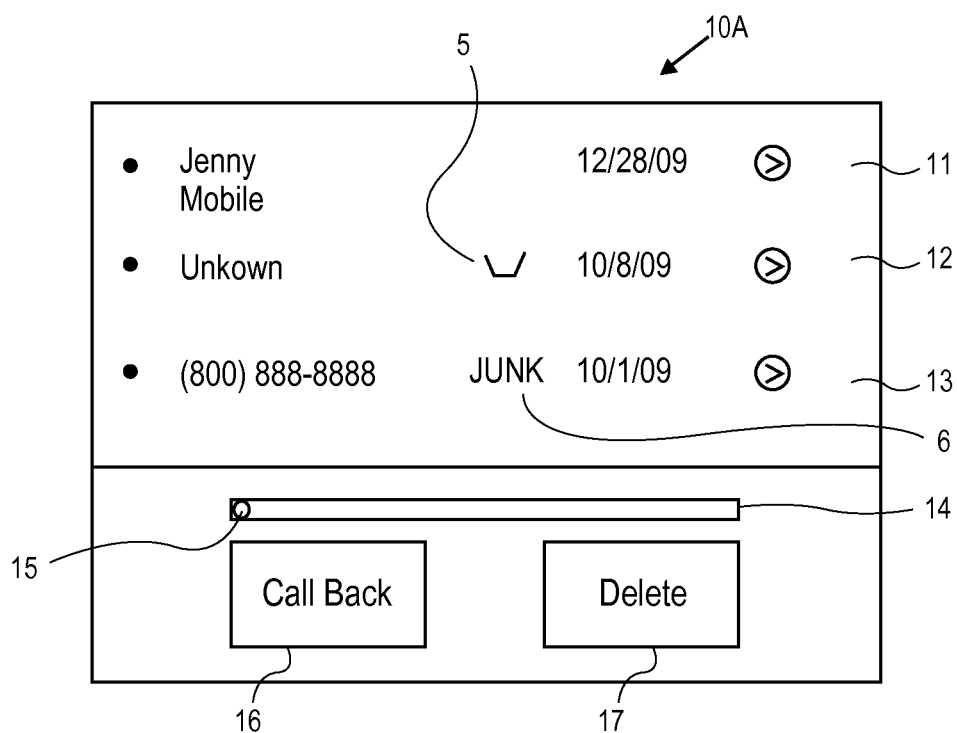
FIG. 3 shows an example of an embodiment of a user interface for a voicemail system according to one embodiment of the present invention.

At least certain embodiments of the present invention can provide an improved user interface which indicates whether or not a voicemail is message-less or otherwise empty. This can be achieved by examining the content of the voicemail to determine whether or not it contains an audible voice or other audible content (e.g. music). As described further below, the content can be examined in a variety of ways in order to determine whether or not the voicemail is message-less. FIG. 3 shows an example of an improved user interface which can employ indicators for indicating that a voicemail is message-less or an indicator to indicate that a voicemail is a junk voicemail. In the user interface shown in FIG. 3, voicemail user interface display region 10A includes three voicemails 11, 12, and 13 arranged as they were in FIG. 1. Voicemail user interface display region 10A also includes timeline 14 and current time indicator 15 as well as call back button 16 and delete button 17. However, unlike the prior art user interfaces of FIGS. 1 and 2, junk mail indicator 6 and empty or message-less indicator 5 can be displayed for particular voicemails. In the example shown in FIG. 3, voicemail 12 includes the message-less indicator 5 and voicemail 13 includes the junk voicemail indicator 6. It will be appreciated that, in one embodiment, each voicemail which is message-less within the list of voicemails will include an indication that the voicemail is message-less, such as the message-less indicator 5. Similarly, it will be appreciated that each voicemail which is considered to be a junk voicemail can include junk voicemail indicator 6. It will also be appreciated that both indicators may be displayed for any voicemail which is determined to be both message-less and junk voicemail. In the example shown in FIG. 3, no voicemail has been selected but both a message-less indicator and a junk voicemail indicator are displayed prior to selection of a voicemail. In an alternative embodiment, the indicators 5 and 6 may not be displayed until the selection of a voicemail. Systems which can perform or implement embodiments of the present invention will now be described before continuing with the discussion of how voicemails are processed.

Figure 4:
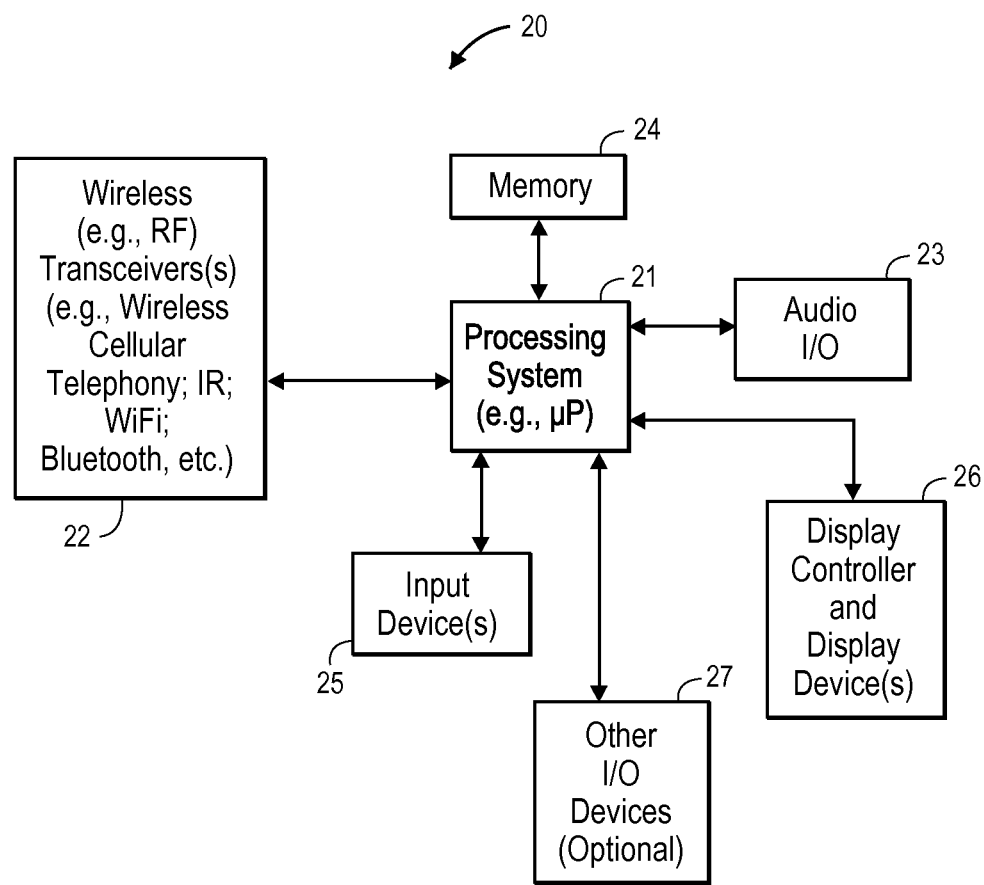
FIG. 4 shows, in block diagram form, an example of a communication device, such as a telephone device, which includes at least one wireless transceiver, such as a wireless network interface.

FIG. 4 shows an example of a data processing system which may be a telephone device or an entertainment device (such as a game system) or a general purpose computer or other consumer electronic devices. The data processing system 20 includes a processing system 21 which may be one or more microprocessors or which may be a system on a chip. The data processing system also includes memory 24 which is coupled to the processing system 21 through one or more buses as is known in the art. The memory 24 may be for storing data and programs for execution by a data processing system. For example, the memory may be a machine readable non-transitory storage medium such as random access memories, flash memory, or other type of non-transitory storage media suitable for storing computer program instructions and data. The memory 24 may also store metadata and audio data for voicemails locally stored on the data processing system 20. The data processing system 20 also includes an audio input/output (I/O) subsystem 23 which may include a microphone and a speaker for, for example, playing back music or providing telephone functionality through the speaker and microphone or for interacting with a voicemail server or a system. A display controller and display device 26 provides a visual user interface for the user; this user interface may include a graphical user interface which is similar to that provided by the iPhone. The display device may include an integrated touch screen such as a multi-touch input panel incorporated on the iPhone. System 20 also includes one or more wireless transceivers which can function as network interfaces in order to allow the system 20 to communicate with other devices through a network, such as a wireless network or a wireless telephone network, etc. The wireless transceivers 22 can include a WiFi transceiver or an infrared transceiver or a Bluetooth transceiver or a wireless cellular telephone transceiver or a combination of one or more of those transceivers. The system 20 can also include one or more input devices 25 which may be buttons or a touch panel as described herein or may be a keypad or keyboard or other known input devices or a combination of such input devices. The system may also include an optional input/output device which may be a connector for a dock or a connector for a USB interface or a network interface, etc. It will be appreciated that one or more buses, not shown, may be used to interconnect the various components shown in FIG. 4 as is well known in the art. It will also be appreciated that additional components, not shown, may also be part of the system 20 in certain embodiments, and in other embodiments, fewer components than that shown in FIG. 4 can also be used in the data processing system according to one embodiment of the present invention. In one embodiment, the data processing system 20 can be an iPhone or an iPad or an iPod Touch, a landline telephone, a voice over IP telephone, etc. In certain embodiments, if the data processing system is a telephone device which is a landline telephone, the wireless transceivers 22 may be omitted. Further examples of data processing systems which may be employed with or implement embodiments of the present invention are further described in published US patent application 2008/0167007, which published US application is incorporated herein by reference. For example, the data processing systems shown in FIGS. 2B and 2C in that published US patent application can be used to implement one or more embodiments of the present invention.

A voicemail system, such as a voicemail server, can be used to record a voicemail when a phone does not answer a phone call. The voicemail system may be a voicemail server implemented in the infrastructure of a public telephone carrier's system or may be a local device contained within a landline phone or other telephone system which can receive and record the voicemail message when the user of the phone does not answer a telephone call. The system 100 shown in FIG. 10 represents a modern telephone system which includes a data network such as the Internet 101 and the conventional, plain old telephone system (POTs) 103 which are in some way interconnected as shown by the overlap between the Internet 101 and the POTs 103. A variety of phones, which can include voice over IP phones and wireless cellular telephones and wireless handheld computers can be interconnected through the telephone system shown in FIG. 10. One or more voicemail servers 111 can receive and store voicemails and provide those voicemails to the phones and other data processing systems in order to allow those systems to provide a visual voicemail interface to a user of the phone. In certain embodiments, the voicemail server may perform certain methods according to the present invention, such as the method shown in FIG. 8. In other embodiments, the voicemail server 111 may transmit the content of the voicemail to a phone or other device to allow the device to perform one or more methods described herein, such as the method shown in FIG. 7 or the method shown in FIGS. 6A, 9A, 9B, 10, and FIG. 11. In at least certain embodiments, a voicemail database may be maintained on a voicemail server or a voicemail database may be maintained on a telephone device or other device, such as phones 119 or 121 or voice over IP phones 117 or computers 115 or wireless cellular telephones 123 or the wireless handheld computers 125. The database on each system may include one or more audio files containing the audio content of the voicemail as well as metadata concerning the voicemail message, such as whether the voicemail has been listened to, whether the message is to be deleted, whether the message has been marked as important or not, etc. Moreover, as described herein, the metadata may include an indicator, such as a message-less indicator or a junk voicemail indicator, which causes the presentation of message-less indicator 5 or junk voicemail indicator 6 as shown in FIG. 3. Further information with respect to the system 100 can be obtained from published US patent application 2008/0167007, which has been incorporated herein by reference.

Figure 6A:
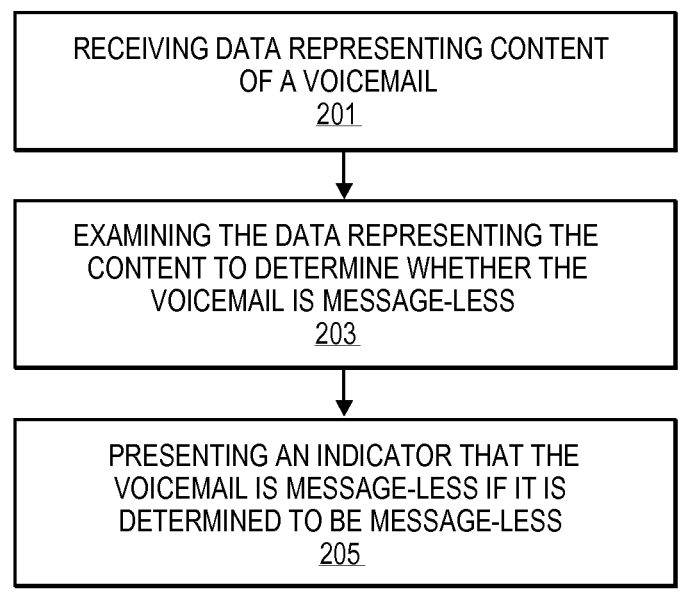
FIG. 6A is a flowchart illustrating a method according to at least one embodiment of the present invention.
Figure 6B:
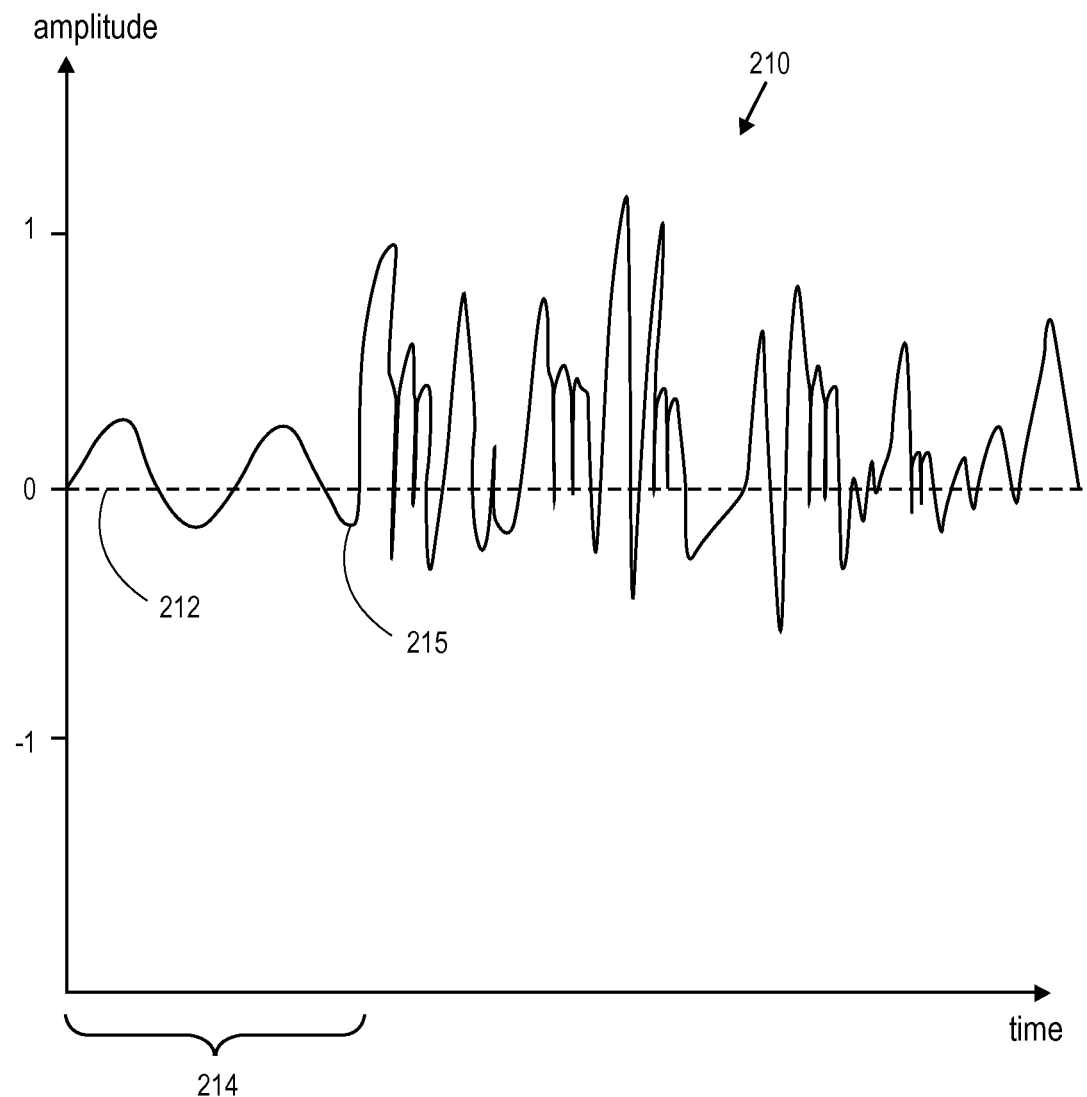
FIG. 6B is a graph which depicts the content of a voicemail.

FIG. 6A shows an example of a general method according to one embodiment of the present invention. This method may be implemented by the data processing system 20 described above or other data processing systems also described herein. In operation 201, a data processing system receives data representing content of a voicemail. This data may be received from a voicemail system, such as a voicemail server within the infrastructure of a telephone system or may be received directly from a telephone system without use of a voicemail server or system in the infrastructure (e.g. in the case of a landline telephone which includes an internal system for storing voicemails and processing those voicemails). The data representing the content of a voicemail can be stored locally on the data processing system in order to perform operation 203. FIG. 6B shows an example of the content of a voicemail. FIG. 6B is a graph of the amplitude of the audio file or sound waves 210 as they vary over time. It can be seen that the sound wave 210 has two portions, the first of which in time is labeled as portion 214 which may be background noise or silence or near silence. This portion 214 may represent a moment of silence before the caller begins leaving the voicemail message which begins at 215. A zero line 212 can be used in one embodiment of the processing methods described further below. Returning to FIG. 6A, the method continues in operation 203 in which data representing the content is examined to determine whether the voicemail is message-less or otherwise empty. If it is determined that the voicemail is message-less, then in operation 205 the system presents an indicator that the voicemail is message-less. Message-less indicator 5 shown in FIG. 3 is an example of such an indicator. Methods for examining the data in operation 203 are further described below.

Figure 7:
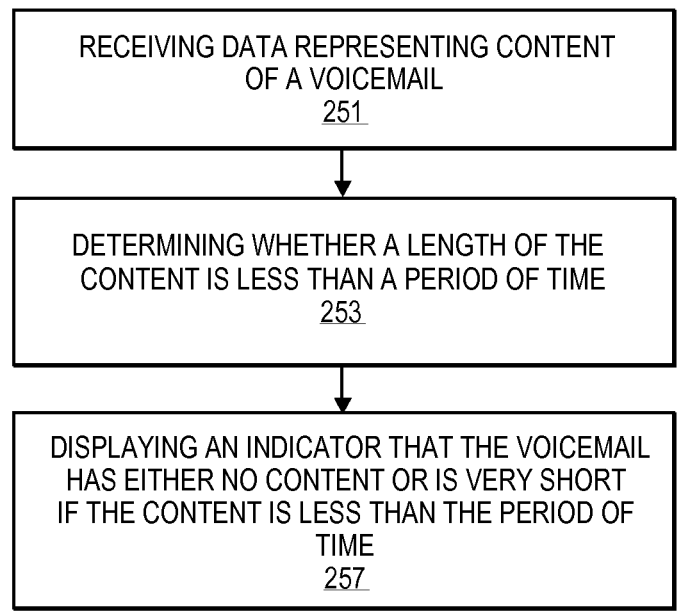
FIG. 7 is a flowchart illustrating a method according to at least certain embodiments of the present invention.

FIG. 7 shows a method according to one embodiment of the present invention in which the content of the voicemail need not be examined in order to determine whether or not the voicemail is message-less. In this embodiment, the system seeks to determine whether the length of the content is less than a period of time, such as less than one second or less than 0.5 seconds, for example. In operation 251, the system receives data representing the content of a voicemail. In this case, the content need not be provided; however, metadata relating to the content, such as the length of the voicemail, can be provided in order to allow operation 253 to be performed. In that operation, it is determined whether the length of the content is less than a period of time which may be, for example, less than one second. If the length is less than the period of time, which may be a predetermined period of time, then an indicator can be displayed in operation 257 to indicate that the voicemail has either no content or is very short or too short, suggesting to the user that it is not necessary to listen to the voicemail. It will be appreciated that the method of FIG. 7 may be combined with the method of FIG. 6A such that two different indicators can be displayed, one indicating that the message is message-less because the content has been examined and another to indicate that the message is too short to contain any useful content.

Figure 8:
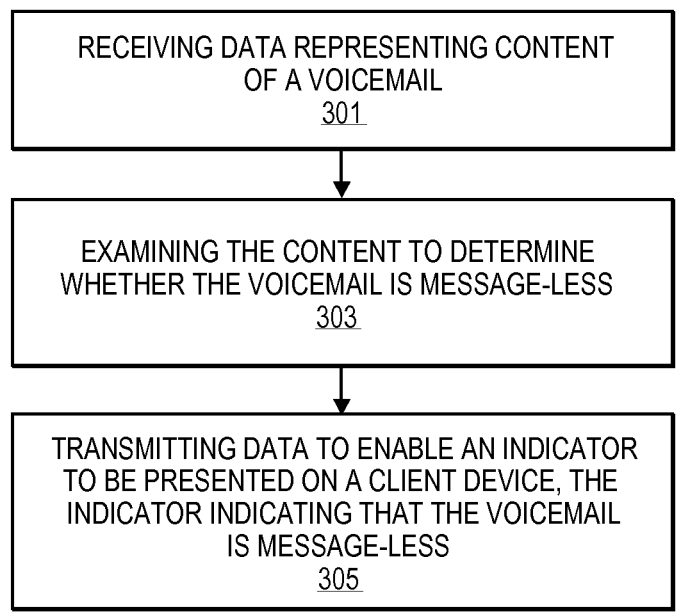
FIG. 8 is a flowchart showing a method according to at least certain embodiments of the present invention.
Figure 9A:
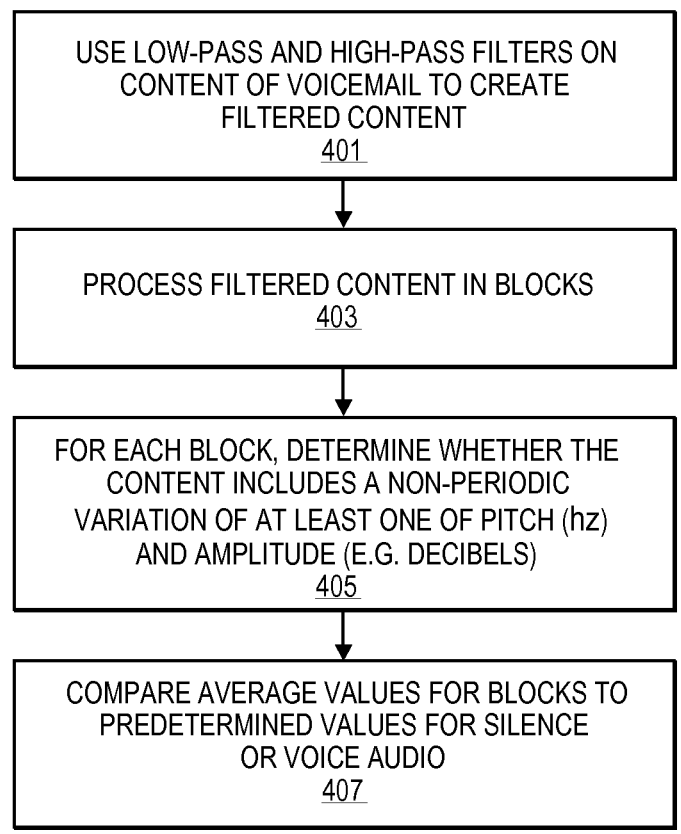
FIG. 9A shows a flowchart representing an embodiment of the present invention.

In one embodiment of the present invention, a voicemail system, such as a voicemail server, can perform a method as shown in FIG. 8. In this method, the voicemail system performs the processing of the content of the voicemail in order to determine whether or not the voicemail is message-less, thereby freeing up the client/phone device from having to perform this operation (and hence conserve battery life on the phone device). In operation 301, the voicemail system receives data representing content of the voicemail and in operation 303 it examines the content to determine whether the voicemail is message-less. The method of examining the content may be as described herein, such as the method shown in FIG. 9A, or the method shown in FIG. 9B, etc. Then in operation 305, the voicemail system transmits data to a phone device to enable an indicator, such as message-less indicator 5, to be presented on a client device, which can be the data processing system 20, and the indicator can indicate that the voicemail is message-less.

The audio content of a voicemail can be processed in many different ways, and the following description provides a few examples of those ways. It will be appreciated that alternative methods may be used while still providing the advantages of the present invention and be covered by the present invention. The method shown in FIG. 9A provides a general example for processing the content of a voicemail; in this example, the content is processed in blocks or subsections, over time, of the audio content and measurements from each block can be compounded together to provide a hint at how the audio should be classified instead of looking at the overall sum of each block or subsection. In operation 401, filters can be used on the content of the voicemail to create filtered content. In one embodiment, a low-pass filter can be used to remove high-frequency noise and a high-pass filter can be used to remove any low-frequency static or noise. Then in operations 403 and 405, the content can be processed within each block. The processing can determine whether the content includes a non-periodic variation of at least one of pitch (measured in hertz) and amplitude (measured in, for example, decibels). An average value of measurements of pitch or amplitude for a collection of blocks can be then compared to values, which can be predetermined, for silence or voice audio or both. The values may be generic values representing silence and voiced audio or, if available, be specific values for a particular phone number, which specific values were obtained from processing prior voicemails from that phone number. The result of the comparison in operation 407 determines whether the content of the voicemail contains a voice or other sounds, such as music, and hence operation 407 can produce the result of the examination of the data representing the content to determine whether the voicemail is message-less, such as operation 203 of FIG. 6A.

Figure 5:
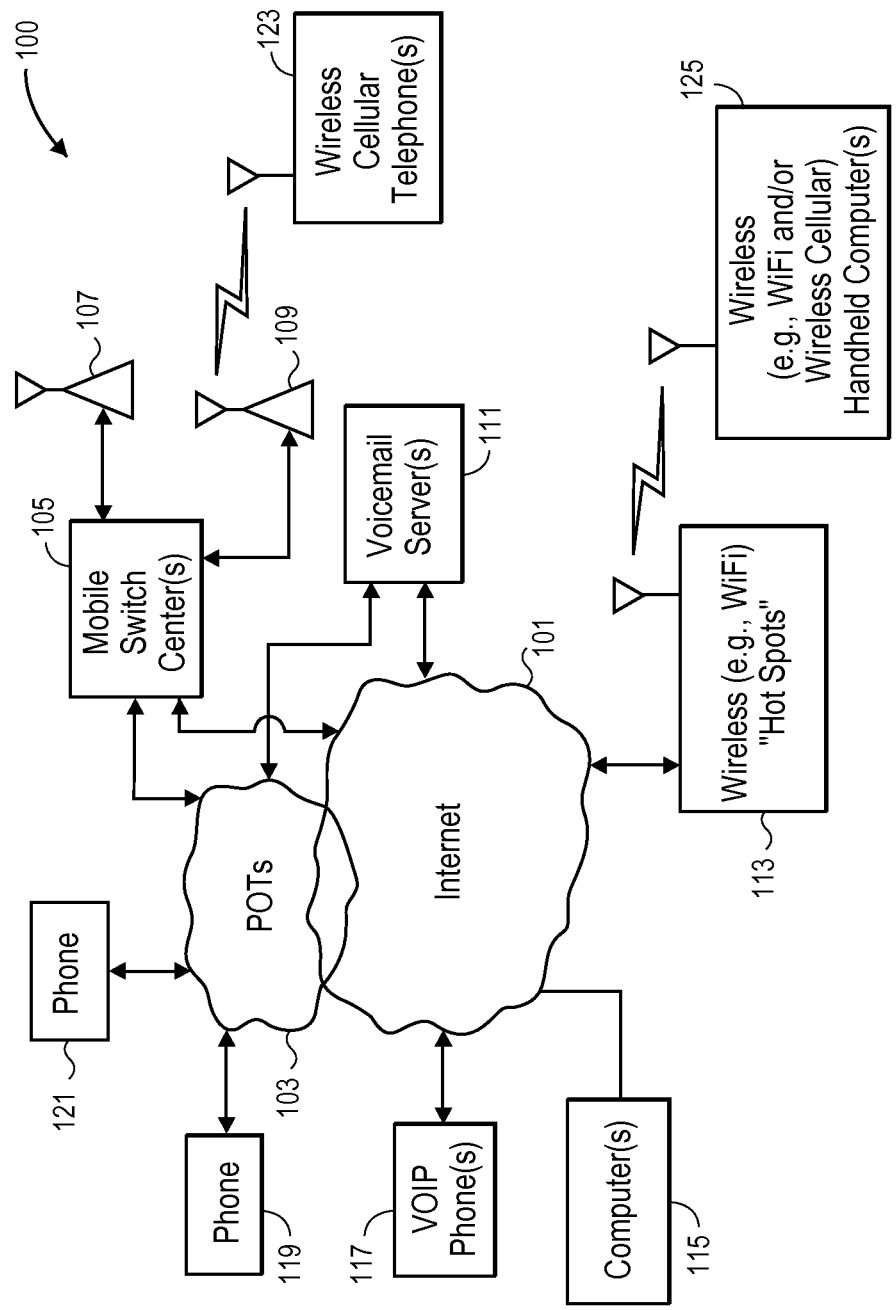
FIG. 5 shows an example of a network which includes telephone devices and at least one voicemail system or server which may be used in at least certain embodiments of the present inventions.
Figure 9B:
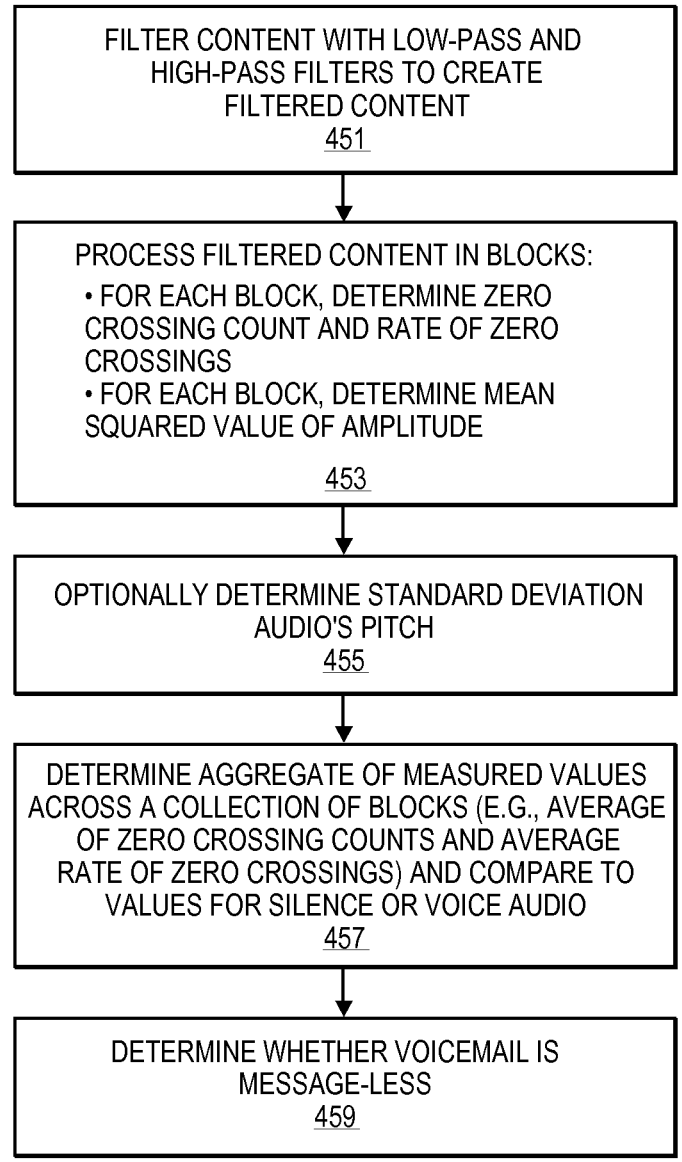
FIG. 9B is a flowchart illustrating a method according to one embodiment of the present invention.
Figure 10:
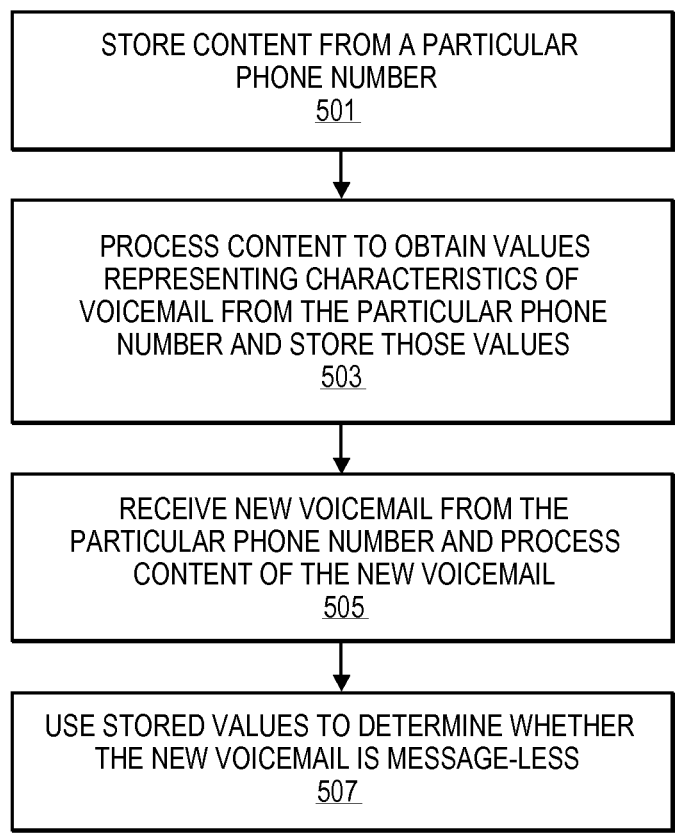
FIG. 10 is a flowchart illustrating an embodiment of the present invention.

FIG. 9B is another example of a method to process the content of a voicemail to determine whether the voicemail is message-less. In operation 451, the audio content of the voicemail is filtered with low-pass and high-pass filters to create the filtered content. Then in operation 453, the filtered content is processed in blocks. In one embodiment, for each block, the number of zero-crossings and the rate of zero-crossings is determined and a mean squared value of the amplitude of the signal is also determined for each block. It will be understood that the zero-crossing count is the number of times the audio signal crosses the zero amplitude line, such as the zero amplitude line 212 shown in FIG. 6B. The rate of zero-crossings will be understood to mean the number of zero-crossings within a period of time. Hence, a higher rate of zero-crossings typically indicates a higher frequency or pitch sound. Silenced audio normally has a lower zero-crossing count than voiced audio. The mean squared value of amplitude is normally higher for voiced audio than for silenced audio. Optionally, a standard deviation of the audio's pitch can be determined (in operation 455) and this can be compared to the standard deviation of pitch for silenced audio; voiced audio should have a larger deviation when compared to silenced audio. Then in operation 457, an aggregate of measured values across the collection of blocks can be determined and compared to generic or specific values for silenced or voiced audio. For example, the average of the zero-crossing counts and the average rate of zero-crossings across a collection of blocks can be compared to predetermined values for silenced audio and predetermined values for voiced audio. The values can be generic values representing one or both of silenced audio and voiced audio or specific values obtained from voicemail messages left from a particular phone number (an example of the use of specific values is provided in conjunction with FIG. 10). In other words, different measurements can be used for different phone numbers when performing the comparison for a newly received voicemail, and these measurements from particular phone numbers can be adjusted over time and improved with usage. In other words, the present invention can, in at least certain embodiments, employ a learning mechanism which learns from received voicemail content of voicemails from a particular phone number. The comparison used in operation 457 may employ thresholds or other methods that distinguish between silenced audio and voiced audio. The comparison can then be used in operation 459 to determine whether the voicemail is message-less which can, in turn, be then used to cause the presentation of an indicator showing that the voicemail is message-less, such as the message-less indicator 5 shown in FIG. 5.

FIG. 10 shows a method for learning or training a system for a particular phone number. The content of a voicemail from a particular phone number can be stored in operation 501 so that it can be processed in operation 503 to obtain values representing characteristics of voicemails from the particular phone number. These values can be stored for later use when a new voicemail is received from that particular phone number, such as in operation 505. When a new voicemail is received from that particular phone number, the content from that new voicemail is processed (e.g. processed by the method shown in FIG. 9B) and the result of that processing produces values which can be used to compare to the stored values, in operation 507, to determine whether the new voicemail is message-less. This method shown in FIG. 10 can be performed repeatedly over time for voicemails from a particular phone number and the stored values, for that particular phone number, can be adjusted over time in order to train the system to properly recognize whether or not a voicemail, received from that particular phone number, is message-less.

Figure 11:
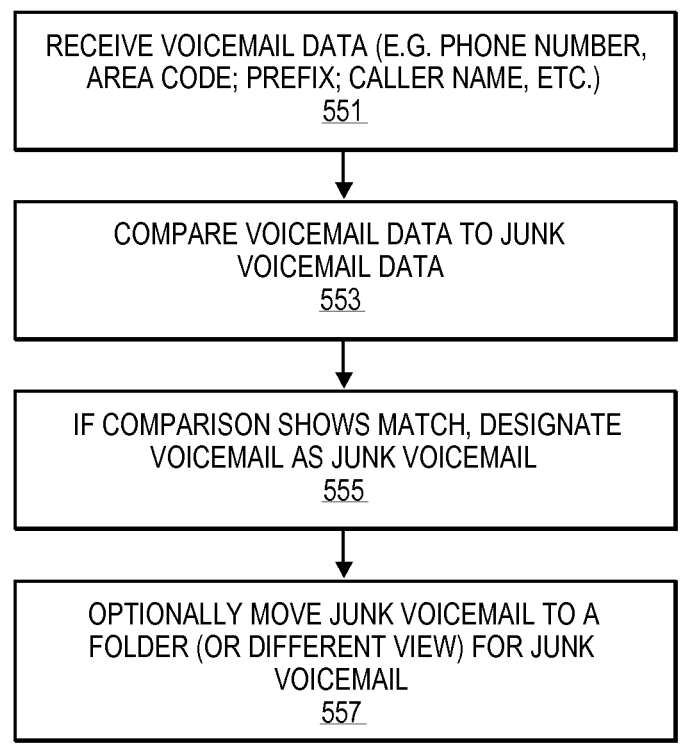
FIG. 11 is a flowchart showing another method according to one embodiment of the present invention.

FIG. 11 represents another embodiment which analyzes voicemail data. In this embodiment, the system attempts to distinguish between voicemail which is useful to a user and voicemail which may be characterized as "junk" voicemail. The user or the system may be set up to store junk voicemail data, such as phone numbers, area codes, prefixes, caller names, etc. which are designated to be junk voicemails. For example, all calls from a particular phone number or all calls from a particular area code or all calls with a particular caller name may be classified or designated as junk voicemails. Using the method of FIG. 11, the system can compare a newly received voicemail to the junk voicemail data, in operation 553, and determine, in operation 555, if the newly received voicemail should be designated as a junk voicemail. The designation of "junk" voicemail can result in the display of an indicator of junk voicemail, such as the junk voicemail indicator 6 shown in FIG. 3. In certain embodiments, the optional operation 557 can be performed to move the junk voicemail to a different folder or to a different view for all junk voicemails. It will also be appreciated that a similar operation of moving a voicemail to a folder or different view for message-less voicemails may also be performed in conjunction with any of the methods shown in FIGS. 6A, 7, 9A, and 9B.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium storing executable program instructions which when executed by a data processing system cause the data processing system to perform a method comprising:
   receiving data representing content of a voicemail;
   examining the content to determine whether the voicemail is message-less;
   presenting an indicator that the voicemail is message-less in response to determining that the voicemail is message-less; and
   presenting a list of voicemails without showing, in the list, a length of each of the voicemails in the list, wherein the indicator is displayed in the list.

2. The medium as in claim 1, wherein the method further comprises:
   receiving a selection of one of the voicemails in the list and in response to the selection, displaying a length of the voicemail selected by the selection, and wherein the indicator, if the selected voicemail is message-less, is displayed in the list before receiving the selection.

3. The medium as in claim 1, wherein the examining comprises determining whether the content includes a non-periodic variation of at least one of pitch and amplitude of the content.

4. The medium as in claim 1, wherein the examining comprises determining a zero-crossing count and determining a rate of zero-crossings over a period of time.

5. The machine readable non-transitory storage medium as in claim 1, wherein the method further comprises:
   storing at least one parameter associated with content of at least one voicemail from a particular phone number, the at least one parameter for use in examining the content of a new voicemail from the particular phone number.

6. The medium as in claim 1 further comprising:
   determining whether a length of the content is less than a period of time; and
   wherein the indicator comprises an indicator that the voicemail has either no content or is very short if, in response to the determining, the content is less than the period of time.

7. A machine implemented method comprising:
   receiving, at a device, data representing content of a voicemail;
   examining the content to determine whether the voicemail is message-less;
   presenting an indicator that the voicemail is message-less in response to determining that the voicemail is message-less; and
   presenting a list of voicemails without showing, in the list, a length of each of the voicemails in the list, wherein the indicator is displayed in the list.

8. The method as in claim 7 wherein the presenting comprises at least one of displaying the indicator on a display device or generating an audible message.

9. The method as in claim 8 wherein the method further comprises:
   presenting a list of voicemails without showing, in the list, a length of each of the voicemails in the list;
   receiving a selection of one of the voicemails in the list and in response to the selection, displaying a length of the voicemail selected by the selection, and wherein the indicator, if the selected voicemail is message-less, is displayed in the list before receiving the selection.

10. The method as in claim 8 wherein the examining comprises determining whether the content includes a non-periodic variation of at least one of pitch and amplitude of the content.

11. The method as in claim 8 wherein the examining comprises determining a zero-crossing count and determining a rate of zero-crossings over a period of time.

12. The method as in claim 10 wherein the method further comprises:
   storing at least one parameter associated with content of at least one voicemail from a particular phone number, the at least one parameter for use in examining the content of a new voicemail from the particular phone number.

13. A data processing system comprising:
   a processing system;
   a memory coupled to the processing system;
   a display device coupled to the processing system;
   a network interface coupled to the processing system, the network interface configured to receive voicemails and wherein the memory is configured to store data representing content of a voicemail and wherein the processing system is configured to examine the content of the voicemail to determine whether the voicemail is message-less and wherein the processing system is configured to present on the display device an indicator that the voicemail is message-less in response to determining that the voicemail is message-less and the processing system is further configured to present on the display device a list of voicemails without showing, in the list, a length of each of the voicemails in the list, wherein the indicator is displayed in the list.

14. The data processing system as in claim 13 wherein the data processing system is a wireless cellular telephone that comprises a display device and wherein the indicator is presented to a user by displaying an icon, indicating that the voicemail is message-less on the display device.

15. The data processing system as in claim 14 wherein the network interface comprises a wireless transceiver and wherein the processing system is configured to examine the content by determining whether the content includes a non-periodic variation in at least one of pitch and amplitude.

16. The data processing system as in claim 14 wherein the processing system is configured to determine a zero-crossing count and the processing system is configured to determine a rate of zero-crossings over a period of time.

17. A machine implemented method comprising:
   receiving, at a device, data representing content of a voicemail;
   determining whether a length of the content is less than a period of time;

displaying an indicator that the voicemail has either no content or is very short if, in response to the determining, the content is less than the period of time; and presenting a list of voicemails without showing, in the list, a length of each of the voicemails in the list, wherein the indicator is displayed in the list.

18. The method as in claim 17 further comprising:

displaying a junk voicemail indicator.

19. The method as in claim 18 wherein the junk voicemail indicator is displayed in response to comparing data about the phone number of a voicemail to a list.

* * * * *